(12) United States Patent
Chang

(10) Patent No.: US 6,533,427 B2
(45) Date of Patent: Mar. 18, 2003

(54) ILLUMINATING DEVICE ADAPTED TO PROVIDE A LIGHT OUTPUT WITH A PREDETERMINED POLARIZATION STATE TO A PROJECTION DISPLAY

(75) Inventor: Shih-Yuan Chang, Hsinchu (TW)

(73) Assignee: Prokia Technology Co., Ltd., Tainan Hsien (TW)

( * ) Notice: Subject to any disclaimer, the term of this patent is extended or adjusted under 35 U.S.C. 154(b) by 0 days.

(21) Appl. No.: 10/025,660

(22) Filed: Dec. 19, 2001

(65) Prior Publication Data

US 2003/0021098 A1 Jan. 30, 2003

(30) Foreign Application Priority Data

Jul. 27, 2001 (TW) ........................................ 090212813

(51) Int. Cl.$^7$ ................................................ F21V 9/14
(52) U.S. Cl. .................... 362/19; 362/359; 362/551; 362/583; 349/62; 385/48
(58) Field of Search ................. 362/19, 583, 551, 362/359; 349/62; 385/48; 359/483, 485, 487

(56) References Cited

U.S. PATENT DOCUMENTS 6,236,785 B1 * 5/2001 Parker et al. ................ 385/48
2001/0048493 A1 * 12/2001 Swanson et al. ............ 349/62

\* cited by examiner

*Primary Examiner*—Sandra O'Shea
*Assistant Examiner*—Mark Tsidulko
(74) *Attorney, Agent, or Firm*—Trop, Pruner & Hu, P.C.

(57) ABSTRACT

An illuminating device includes a light guiding pipe confining a passage, a reflector mounted at a light input end of the passage, and a quarter-wavelength plate and a reflective polarizer which are disposed in sequence relative to the passage. The reflector reflects light that travels from the light output end to the light input end back to the light output end. The polarizer allows light of a first polarization state to pass therethrough while reflecting light of a second polarization state back into the passage via the light output end, whereupon the light of the second polarization state is converted by the quarter-wavelength plate into the light of the first polarization state for passage through the polarizer.

4 Claims, 4 Drawing Sheets

ILLUMINATING DEVICE ADAPTED TO PROVIDE A LIGHT OUTPUT WITH A PREDETERMINED POLARIZATION STATE TO A PROJECTION DISPLAY

CROSS-REFERENCE TO RELATED APPLICATION

This application claims priority of Taiwan Patent Application No. 90212813, filed on Jul. 27, 2001.

BACKGROUND OF THE INVENTION

1. Field of the Invention

The invention relates to an illuminating device, more particularly to an illuminating device that is adapted to provide a light output with a predetermined polarization state to a projection display, thereby achieving a higher light utilization rate.

2. Description of the Related Art

Light is a kind of electromagnetic wave that, in addition to having the characteristics of direction of travel, frequency, and phase, etc., also has a polarization. Light with a fixed direction of electric field oscillation and a direction of magnetic field oscillation is known as polarized light. Where the polarized light has an electric field direction parallel or perpendicular to an incident light ray, the same is referred to as P-polarized light or S-polarized light. As polarized light occurs only in a plane and can be interpreted by using mathematical models, it provides facility in use. Therefore, in a conventional projection display system, a light polarization state converter is often employed to convert the polarization state of light from one to the other for optimum utilization of light rays.

Referring to FIGS. 1 and 2, a conventional illuminating device 1 for a projection display system is shown to include a light source 11, a light integrator 12, a polarization state converter 2 and a lens unit 13. The light source 11 includes a reflector 111 and a light bulb 112. The reflector 111 is disposed to reflect the light rays emitted from the light bulb 112 toward the light integrator 12 for passage through the polarization state converter 2 and the lens unit 13 for subsequent projection on a display panel 14. The polarization state converter 2 in the conventional illuminating device 1 includes a reflective seat 21 and a plurality of half-wavelength plates 22. The reflective seat 21 has a light input side 211, a light output side 212, and a plurality of first and second plated films 213, 214 alternately arranged and interposed between the light input side 211 and the light output side 212. The light input side 211 faces the light integrator 12, and is provided with a plurality of light shielding regions 215 that are vertically spaced apart from each other. The light output side 212 faces the display panel 14. The first and second plated films 213, 214 are disposed parallel to each other and to incline downwardly from the light input side 211 to the light output side 212. The half-wavelength plates 22 are disposed on the light output side 212 facing the display panel 14 such that they are vertically spaced apart from each other. The half-wavelength plates 22 correspond in position and length to reflective portions of the first plated films 213, respectively.

When S-polarized light is employed for displaying images in the conventional projection display system, light of both the P-polarization state and the S-polarization state from the light source 11 radiates toward the light integrator 12 and the polarization state converter 2. When light of the P-polarization state reaches parts of the light input side 211 that are not shielded by the light shielding regions 215, it will pass directly through the first plated films 213 and the half-wavelength plates 22, and is converted into light of the S-polarization state for subsequent projection onto the display panel 14. However, when light of the S-polarization state reaches the first plated films 213, it will be reflected by the latter toward the second plated films 214 for further reflection so as to pass through parts of the light output side 212 that are not provided with the half-wavelength plates 22 for projection onto the display panel 14. Accordingly, when P-polarized light is adopted for the conventional projection display system, the half-wavelength plates 22 will be disposed to correspond in position to reflective portions of the second plated films 214 so as to convert the S-polarized light radiated from the light source 11. A further discussion thereon is dispensed with herein for the sake of brevity.

In the conventional illuminating device 1, in order that the light to be projected onto the display panel 14 can have the same polarization state, about one-half of the area of the light input side 211 of the reflective seat 21 has to be provided with the light shielding regions 215 so that the light passing through the light input side 211 can be effectively converted for utilization. Although the construction of the aforesaid device 1 can ensure that the light outputted to the display panel 14 has the same polarization state, about 50% of the light emitted from the light source 11 is wasted. It is therefore evident that although the polarization state converter 2 is capable of providing light of the same polarization state, the light conversion efficiency is low, and the luminosity of the converted light is relatively poor.

SUMMARY OF THE INVENTION

Therefore, the main object of the present invention is to provide an illuminating device that is adapted to provide a light output with a predetermined polarization state to a projection display and that is capable of overcoming the aforesaid drawbacks of the prior art.

Accordingly, an illuminating device of the present invention is adapted to provide a light output to a projection display, and includes a light source, a light guiding pipe, a quarter-wavelength plate, a reflective polarizer, and a reflector. The light source generates output light that converges at a focal point. The light guiding pipe is aligned with the light source along an optical axis, and has a reflective surrounding wall surface that defines a passage. The passage has a light input end proximate to the light source, and a light output end distal from the light source. The focal point is coincident with a plane of the light input end such that the output light from the light source can enter into the passage via the light input end, can be guided by the surrounding wall surface toward the light output end, and can exit from the passage via the light output end. The quarter-wavelength plate and the reflective polarizer are disposed in sequence relative to the passage of the light guiding pipe such that the light that travels in a direction from the light input end to the light output end of the light guiding pipe passes through the quarter-wavelength plate before reaching the reflective polarizer. The reflective polarizer allows light of a first polarization state to pass therethrough, and reflects light of a second polarization state back into the passage of the light guiding pipe via the light output end. The reflector is mounted on the light guiding pipe at the light input end of the passage, and has an outer surface that faces the light source, an inner surface that faces the light output end of the passage, and a through-hole that extends through the outer and inner surfaces of the reflector and that is centered at the focal point to permit entry of the output light from the light source into the passage. The reflector reflects the light that travels in the light guiding pipe in a direction from the light output end to the light input end back to the light output end. The light of the second polarization state that was reflected by the reflective polarizer is converted into the light of the first polarization state when passing through the quarter-wavelength plate for a second time.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
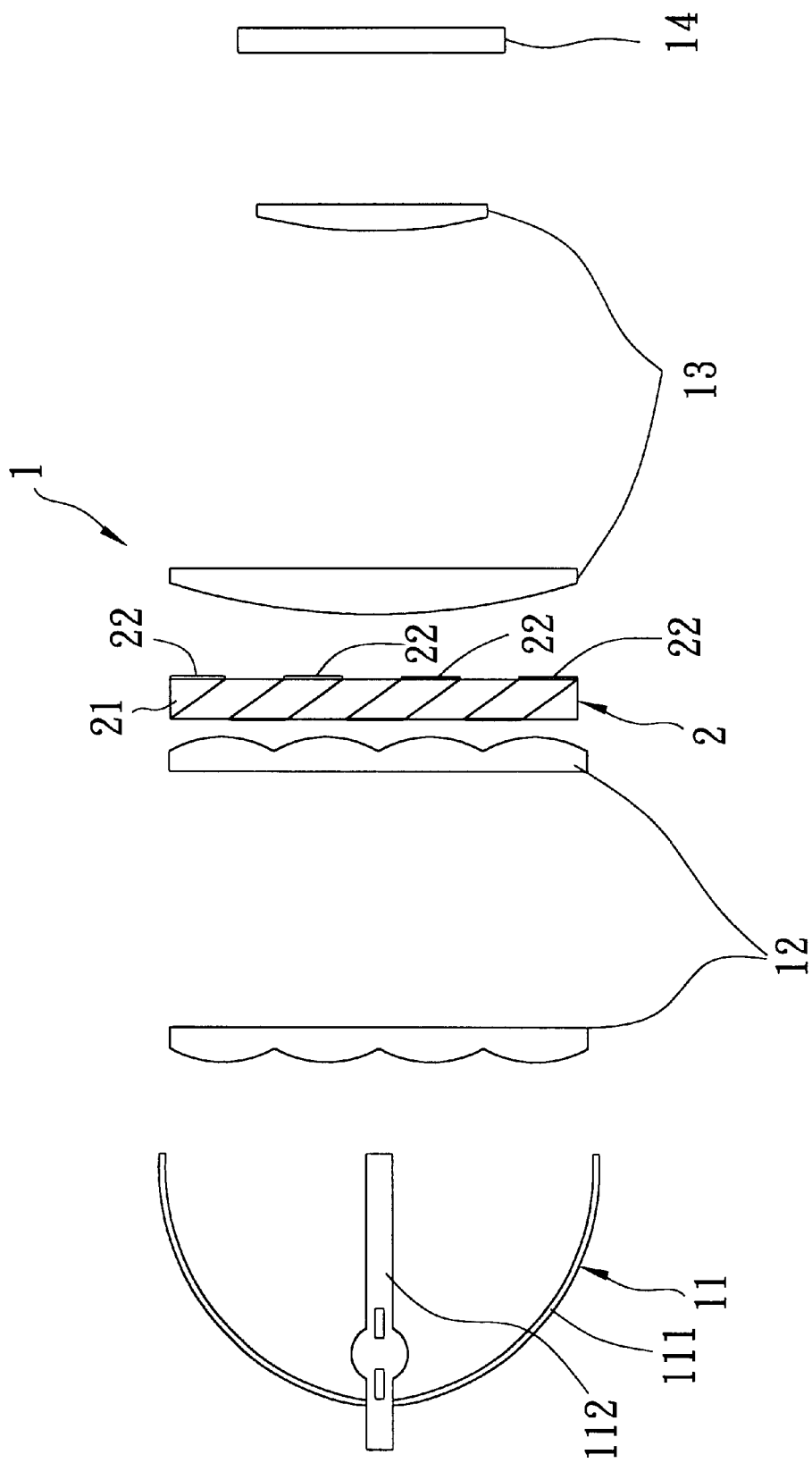
FIG. 1 is a schematic view of a conventional illuminating device for a projection display system, showing the relationship between a conventional polarization state converter and other components of the device.
Figure 2:
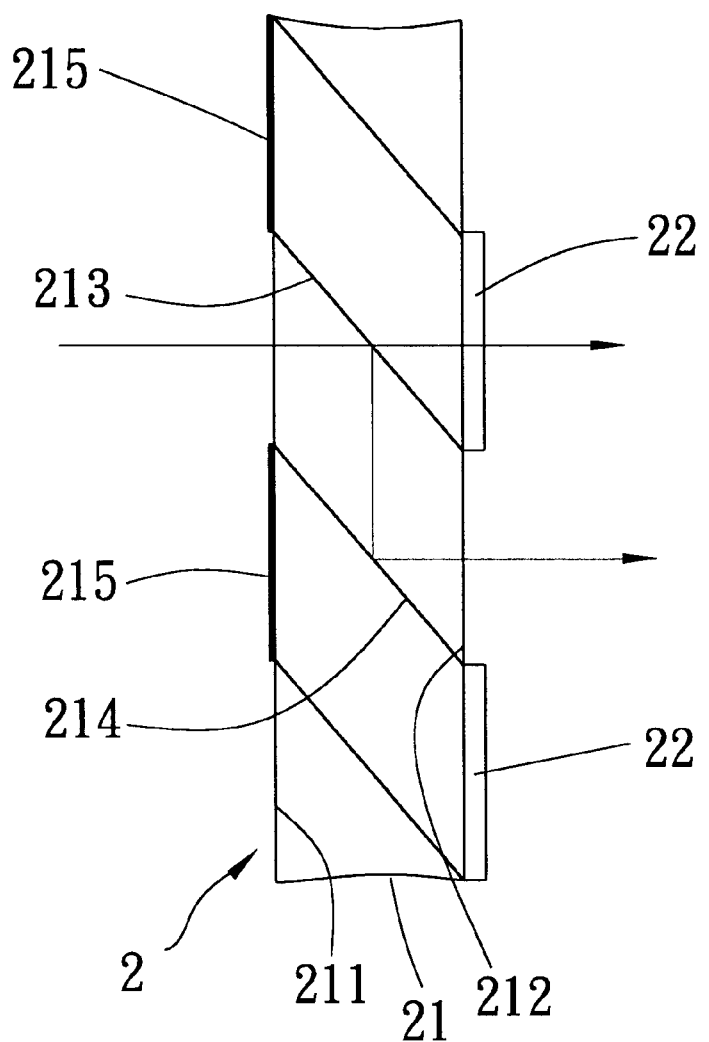
FIG. 2 is an enlarged fragmentary schematic view of the conventional polarization state converter shown in FIG. 1.

Before the present invention is described in greater detail, it should be noted that like elements are denoted by the same reference numerals throughout the disclosure.

Figure 3:
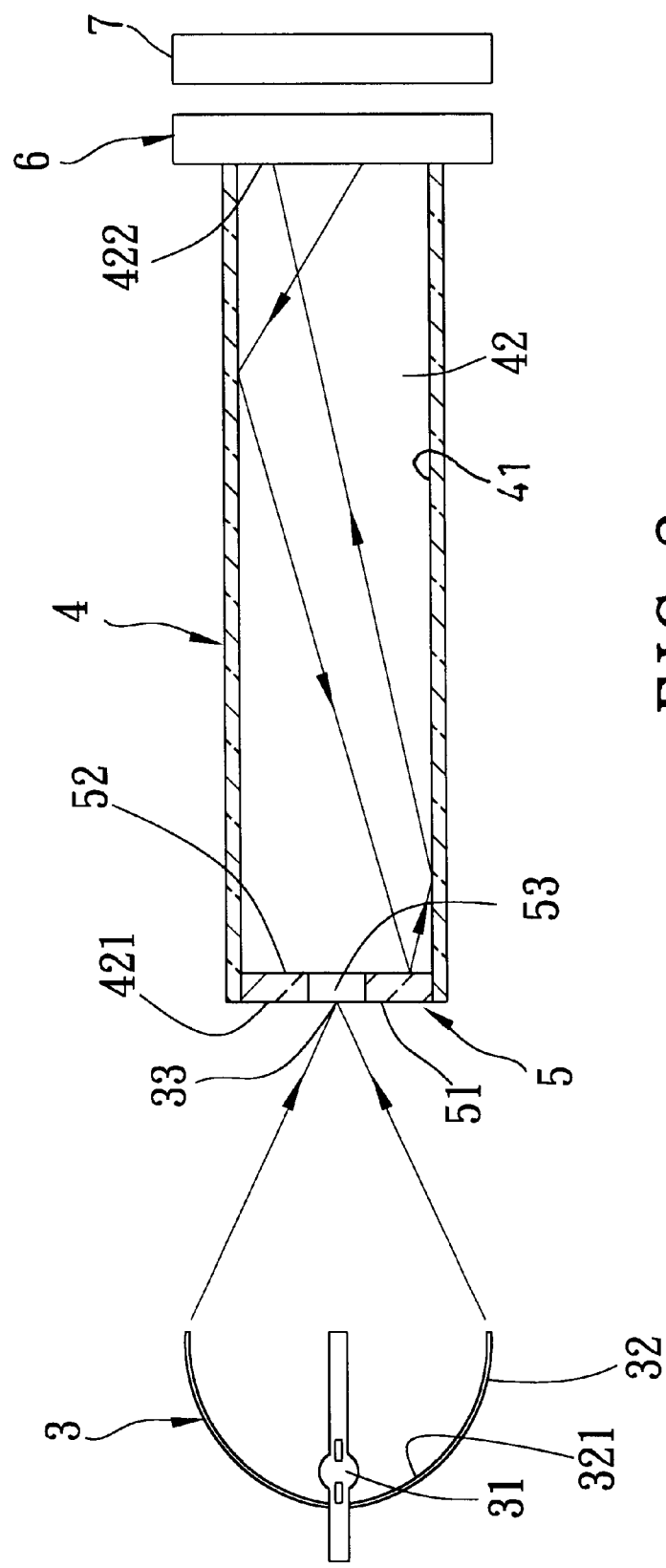
FIG. 3 is a schematic view of the first preferred embodiment of an illuminating device according to the invention.

Referring to FIG. 3, the first preferred embodiment of an illuminating device according to the present invention is shown to be adapted to provide a light output to a projection display and includes a light source 3, a light guiding pipe 4, a reflector 5, a quarter-wavelength plate 6, and a reflective polarizer 7.

The light source 3 includes a light bulb 31, and a curved reflector 32 having an elliptical reflecting surface 321 for reflecting the light from the light bulb 31 and for converging the same at a focal point 33 to result in output light.

The light guiding pipe 4, which may be a hollow pipe or a solid rod, is aligned with the light source 3 along an optical axis. In this embodiment, the light guiding pipe 4 is in the form of a hollow pipe, and has a reflective inner surrounding wall surface 41 that defines a passage 42. The passage 42 has a light input end 421 proximate to the light source 3, and a light output end 422 distal from the light source 3. The focal point 33 is coincident with a plane of the light input end 421 such that the output light from the light source 3 can enter into the passage 42 via the light input end 421, and can be guided by the inner surrounding wall surface 41 toward the light output end 422 for subsequent exit from the passage 42 via the light output end 422.

The reflector 5 is mounted on the light guiding pipe 4 at the light input end 421 of the passage 42. The reflector 5 has an outer surface 51 that faces the light source 3, an inner surface 52 that faces the light output end 422 of the passage 42, and a through-hole 53 that extends through the outer and inner surfaces 51, 52 of the reflector 5 and that is centered at the focal point 33 to permit entry of the output light from the light source 3 into the passage 42. The size of the through-hole 53 relative to the total area of the reflector 5 is selected according to the conversion efficiency that is desired to be achieved. In this embodiment, the through-hole 53 has a cross-sectional area along a transverse plane transverse to the optical axis that is about one-third of a total cross-sectional area of the reflector 5 along the transverse plane.

The quarter-wavelength plate 6 and the reflective polarizer 7 are disposed in sequence relative to the passage 42 of the light guiding pipe 4 such that the light that travels in a direction from the light input end 421 to the light output end 422 of the light guiding pipe 4 passes through the quarter-wavelength plate 6 before reaching the reflective polarizer 7. In this embodiment, the quarter-wavelength plate 6 and the reflective polarizer 7 are disposed externally of the light guiding pipe 4 such that the quarter-wavelength plate 6 is disposed between the light output end 422 of the light guiding pipe 4 and the reflective polarizer 7. The quarter-wavelength plate 6 is an optical component having a birefringent characteristic, and is used to adjust the phase of light that passes therethrough. When linearly polarized light passes through a quarter-wavelength plate, if the polarization direction forms a 45-degree angle with an optical axis of the quarter-wavelength plate, the linearly polarized light will be converted into circularly polarized light. Under the same conditions, circularly polarized light that passes through the quarter-wavelength plate will be converted to linearly polarized light. Based on this principle, if a reflector is disposed posterior to the quarter-wavelength plate, linearly polarized output light that passes through the quarter-wavelength plate is converted into circularly polarized light, which is subsequently reflected by the reflector. The reflected light passes through the quarter-wavelength plate as linearly polarized light which has a polarization direction that is perpendicular to the linearly polarized output light.

The reflective polarizer 7 allows light of a first polarization state to pass therethrough, and reflects light of a second polarization state back into the passage 42 of the light guiding pipe 4 via the quarter-wavelength plate 6 and the light output end 422. In this embodiment, the reflective polarizer 7 allows light of the P-polarization state to pass therethrough, and reflects light of the S-polarization state.

When the light source 3 is activated, output light from the light bulb 31 will be reflected by the reflecting surface 321 so as to converge at the focal point 33, i.e., at the through-hole 53 in the reflector 5. As such, the output light enters the passage 42 via the light input end 421 for light synthesis. The output light is guided by the inner surrounding wall surface 41 toward the light output end 422, and exits from the passage 42 via the light output end 422. The output light then passes through the quarter-wavelength plate 6 and reaches the reflective polarizer 7. Assuming that the output light from the light source 3 is composed of about 50% S-polarized light and about 50% P-polarized light, in view of device constraints, only about 90% of the P-polarized light will pass directly through the reflective polarizer 7, which constitutes about 45% of the total output light. The 50% S-polarized light and the 5% P-polarized light (i.e., 10% of the 50% P-polarized light) will be reflected by the reflective polarizer 7 back into the passage 42 of the light guiding pipe 4 via the quarter-wavelength plate 6 and the light output end 422.

The light of the S-polarization state that was reflected back into the passage 42 of the light guiding pipe 4 will be reflected by the reflector 5 back to the light output end 422 so as to reach the reflective polarizer 7 via the quarter-wavelength plate 6 once again. Since the light of the S-polarization state is converted into light of the P-polarization state when passing through the quarter-wavelength plate 6 for a second time, the percentage of P-polarized light converted from S-polarized light which can pass through the reflective polarizer 7 can be calculated as follows, wherein 0.5 is the original 50% S-polarized light, ⅔ is the assumed percentage of the area of the reflector 5 that is reflective, and 0.9 is the percentage of P-polarized light that is permitted to pass through the reflective polarizer 7: 0.5×⅔×0.9=0.3.

As for the 5% P-polarized light that cannot pass through the reflective polarizer 7 at the first try, after being twice reflected by the reflective polarizer 7 and the reflector 5, about 2% thereof can pass through the reflective polarizer 7 at the second try, as shown in the following calculation: 0.05×⅔×⅔×0.9=0.02 (2%). Thus, of the total amount of light generated by the light source 3 in this embodiment, the total percentage of light of the P-polarization state that passes through the reflective polarizer 7 is: 0.45+0.3+0.02= 0.77. This percentage is evidently higher than that achieved in the prior art. As such, the present invention can effectively increase light utilization rate by 1.54 times (0.77/0.5). The light utilization rate can be expressed by the following formula:

$$Tp + \frac{2 \times Rs \times Am \times Tp}{A}$$

wherein it is supposed that the basic unit of the intensity of each of the P-polarized light and the S-polarized light that are incident on the light guiding pipe 4 is 1, that $Tp$ and $Rp$ are respectively penetration rate and reflection rate of the P-polarized light, that $Ts$ and $Rs$ are respectively penetration rate and reflection rate of the S-polarized light, and that $A$ and $Am$ are respectively total cross-sectional area and reflective area of the light guiding pipe 4.

It can therefore be appreciated that the light utilization rate can be increased by 1.54 times or even higher, and that the luminosity achievable in a projection system which incorporates the present invention can also be enhanced.

Figure 4:
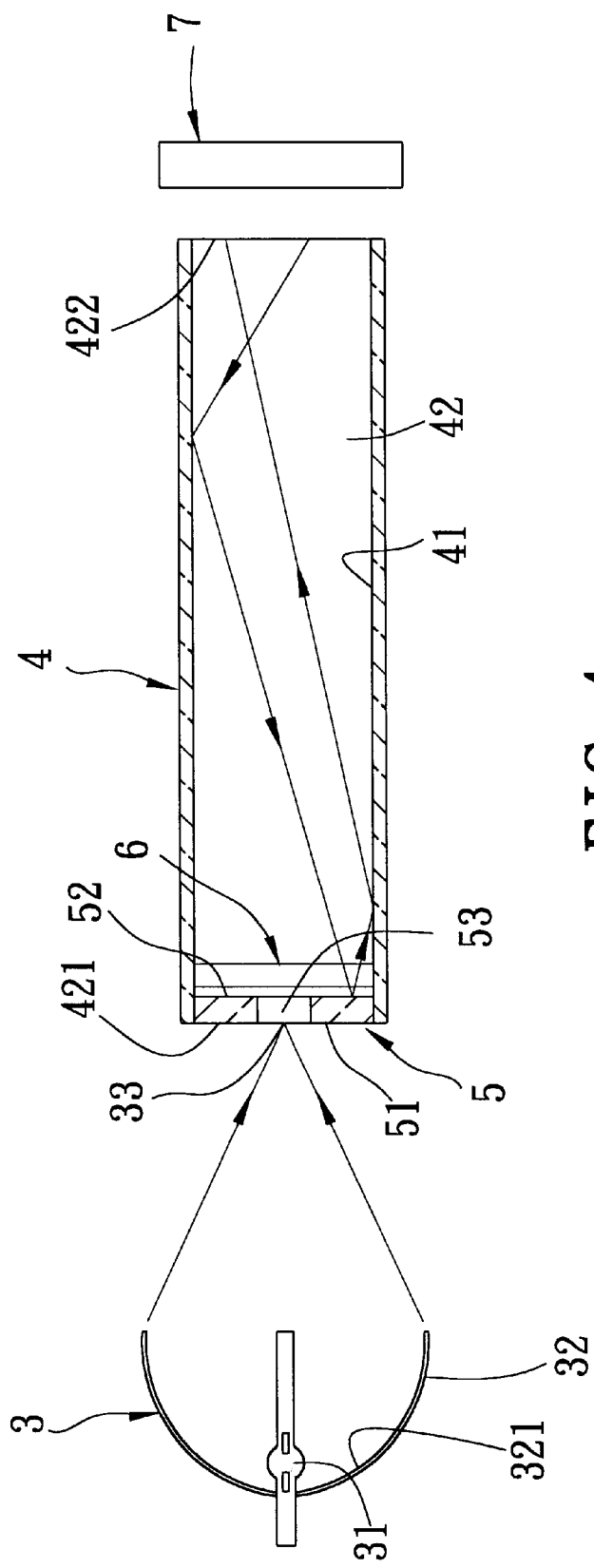
FIG. 4 is a schematic view of the second preferred embodiment of an illuminating device according to the invention.

FIG. 4 shows the second preferred embodiment of an illuminating device according to the present invention. This embodiment is essentially similar to the first preferred embodiment. The differences between these two embodiments reside in that the quarter-wavelength plate 6 is disposed in the light guiding pipe 4 between the light input end 421 and the light output end 422, and that the reflective polarizer 7 is disposed externally of the light guiding pipe 4 adjacent to the light output end 422.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An illuminating device adapted to provide a light output to a projection display, said illuminating device comprising:

a light source for generating output light that converges at a focal point;

a light guiding pipe aligned with said light source along an optical axis, said light guiding pipe having a reflective surrounding wall surface that defines a passage, said passage having a light input end proximate to said light source, and a light output end distal from said light source, said focal point being coincident with a plane of said light input end such that the output light from said light source can enter into said passage via said light input end, can be guided by said surrounding wall surface toward said light output end, and can exit from said passage via said light output end;

a quarter-wavelength plate and a reflective polarizer disposed in sequence relative to said passage of said light guiding pipe such that the light that travels in a direction from said light input end to said light output end of said light guiding pipe passes through said quarter-wavelength plate before reaching said reflective polarizer;

said reflective polarizer allowing light of a first polarization state to pass therethrough and reflecting light of a second polarization state back into said passage of said light guiding pipe via said light output end; and a reflector mounted on said light guiding pipe at said light input end of said passage, said reflector having an outer surface that faces said light source, an inner surface that faces said light output end of said passage, and a through-hole that extends through said outer and inner surfaces of said reflector and that is centered at said focal point to permit entry of the output light from said light source into said passage;

said reflector reflecting the light that travels in said light guiding pipe in a direction from said light output end to said light input end back to said light output end;

wherein the light of the second polarization state that was reflected by said reflective polarizer is converted into the light of the first polarization state when passing through said quarter-wavelength plate for a second time.

2. The illuminating device as defined in claim 1, wherein said through-hole has a cross-sectional area along a transverse plane transverse to the optical axis that is about one-third of a total cross-sectional area of said reflector along the transverse plane.

3. The illuminating device as defined in claim 1, wherein said quarter-wavelength plate and said reflective polarizer are disposed externally of said light guiding pipe such that said quarter-wavelength plate is disposed between said light output end of said light guiding pipe and said reflective polarizer.

4. The illuminating device as defined in claim 1, wherein said quarter-wavelength plate is disposed in said light guiding pipe between said light input end and said light output end, and said reflective polarizer is disposed externally of said light guiding pipe adjacent to said light output end.

* * * * *